United States Patent [19]

Gille et al.

[11] Patent Number: 4,522,841

[45] Date of Patent: Jun. 11, 1985

[54] PROCESS FOR THE STABILIZATION WITH RESPECT TO A DESIRED PATH OF A MEMBER WHICH IS MOVABLY MOUNTED ACCORDING TO AT LEAST ONE COMPONENT OF MOVEMENT AND ITS APPLICATION TO THE STABILIZATION OF A SPRAY MANIFOLD

[75] Inventors: Etienne Gille; Jean Lucas; Didier Méchineau; Marie-Odile Monod, all of Antony, France

[73] Assignee: Centre National Du Machinisme Agricole, Du Genie Rural, Des Eaux et des Forets (Cemagref), Antony, France

[21] Appl. No.: 433,695

[22] Filed: Oct. 12, 1982

[30] Foreign Application Priority Data

Oct. 9, 1981 [FR] France ............................ 81 19099

[51] Int. Cl.³ ............................................. B05D 1/02
[52] U.S. Cl. ............................................ 427/4; 118/668; 118/712; 118/305; 118/323; 239/160; 239/164; 73/634; 73/641
[58] Field of Search ............... 118/668, 680, 712, 305, 118/323; 427/4; 239/159, 160, 164, 166, 167, 168, 170, 171; 73/634, 641; 47/1.7, 48.5

[56] References Cited

U.S. PATENT DOCUMENTS 3,223,330 12/1965 Plante .................... 239/168
3,731,879 5/1973 Dijkhof .................. 239/167

FOREIGN PATENT DOCUMENTS 2431255 2/1980 France .
1042932 9/1966 United Kingdom ............. 239/171
2025665 1/1980 United Kingdom .

Primary Examiner—Shrive P. Beck
Attorney, Agent, or Firm—Young & Thompson

[57] ABSTRACT

A movably mounted element (1) is stabilized with respect to a desired path according to one component of movement. The element is mounted with complete freedom of movement along that component of movement which takes part in the formation of the actual path and to maintain or return the movable member (1) to the predetermined path, for example, maintaining a spray manifold parallel to the ground. With the aid of a jack (10) there is exerted, between the movable member and its support point or points (3) and as a function of the position of the movable member with respect to the desired path, one or more forces whose magnitude is independent of the position of the movable member with respect to the points of support. The invention is applicable to movable members having plural degrees of movement in rotation and/or translation and particularly for the stabilization of a spray manifold.

7 Claims, 2 Drawing Figures

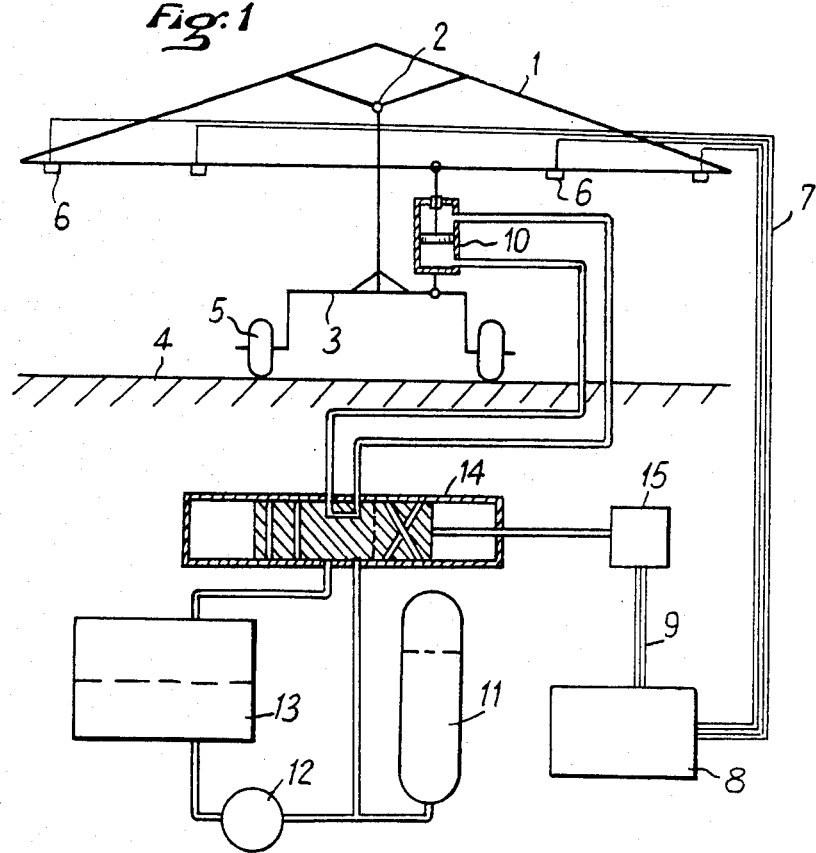
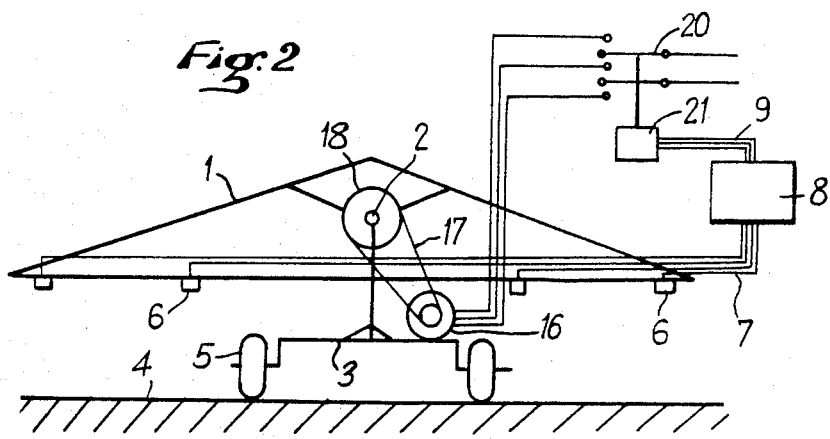

PROCESS FOR THE STABILIZATION WITH RESPECT TO A DESIRED PATH OF A MEMBER WHICH IS MOVABLY MOUNTED ACCORDING TO AT LEAST ONE COMPONENT OF MOVEMENT AND ITS APPLICATION TO THE STABILIZATION OF A SPRAY MANIFOLD

The present invention has for its object to stabilize with respect to a desired path the position of a member movably mounted according to at least one component of movement which is part of the actual path at one or more support points according to a path making it possible for the moving body to follow the desired path, this mounting ensuring freedom of movement according to the component or components of movement that contribute to the path. By freedom of movement is meant that the moving body is subjected relative to the component of movement in question, to no return force of substantial magnitude acting toward a particular position, the movable body tending to remain by inertia in the position it occupies, or the movement which it has, relative to the component of movement. The freedom of movement may be in the nature of translation or rotation. The freedoms of movement may be combined with respect to the desired path. A freedom of movement in simple rotation may be free rotation about an axis, for example the transverse inclination of a spray manifold about a longitudinal axis of the mounting chassis and in particular a longitudinal axis passing through the center of gravity of the manifold. A double freedom of movement in rotation may be the combination of two free rotations about two transverse axes, for example free rotation (with balanced mass) about a transverse axis perpendicular to the axle and to the longitudinal axis of the carrying chassis, of the above-mentioned longitudinal axis carrying the spray manifold so as to make its position independent of variations in direction of the carrying chassis. A triple freedom of movement of rotation might be free rotation of a cardan suspended engine turret on its chassis about longitudinal and transverse axes with a possibility of friction-free rotation about its vertical axis. A freedom of movement in translation may be a freedom of vertical translation, for example in the case of a moving body suspended in a semi-freely flexible manner on a carrying member, such as, for example, a hydropneumatic suspension with a large volume accumulator, or freedom of transverse or longitudinal translation with respect to a carrying chassis to avoid transverse or longitudinal reaction from firing, of the carrying chassis on the movable device carried by said chassis, for example by means of roller bearings. These three freedoms of translatory movement may of course be combined with each other and with the three freedoms of rotative movement in all desired ways and in any number. This definition will make it clearly apparent that the elastic suspensions which tend to return the suspended mobile movable body, with a force that varies as the distance of the movable body from a predetermined position, into said predetermined position relative to its support and so much the more the rigid connections, do not ensure a mounting with freedom of movement of the type of the present invention. By contrast there is freedom of movement in the case of an infinitely flexible elastic suspension as set forth above or of a couple which is constant in value and direction because the magnitudes of the forces exerted on the movable body are independent of the position of the movable body with respect to the points of support.

By "path" is meant the succession in time of the positions of the movable body with respect to the component or components of movement according to which it is movable. The path may thus be defined as a horizontal position or a given inclination, a constant or variable height, etc., the components of definition of a simple "path" being possibly combined, for example a horizontal position and a constant height.

The desired "path" is defined with respect to a physical reference which may be anything at all, artificial or natural, with respect to which the variations of the position of the movable member which must be stabilized may be known in magnitude and direction, by measurement, detection or computation.

The physical reference may be the surface of the ground over which move the movable members in the case of the stabilization of the transverse inclination of a spray manifold or the stabilization in height of a suspended movable member in a practically infinitely flexible manner, a horizon or an artificial bearing established clinometrically or gyroscopically or a direction reference point in the case of double or triple freedom of rotation to stabilize one or more of the positions.

Processes are already known for stabilizing the horizontal position, the height, the inclination or the orientation of movable bodies suspended on one or more solid supports. Such a stabilization process applied to a spray manifold is described for example in British Pat. No. 2,025,665. In this patent the manifold is mounted on supports, namely the chassis rolling on the ground, by an elastic suspension, which, as described above, does not itself ensure freedom of movement but exerts forces tending to reestablish parallelism between the manifold and the plane of the supports, even if the manifold is, at that particular moment, parallel to the ground. This manifold is pivotally mounted about a horizontal axis fixed to the central body and is characterized in that instead of elastic means or a return force combining gravity and an axis of articulation located above the center of gravity, there are means, controlled by position detectors comparing the distances from the ground of two points on the manifold, which act between the manifold and the principal body to modify the position of the manifold with respect to this principal body and thus with respect to the ground, the principal body being positionally stabilized with respect to the supports by the elastic suspension. In this patent the responsive means positively change the position relative to the manifold with respect to the elastically suspended principal body as a function of the position of the manifold relative to the desired path. There is therefore no freedom of movement between the manifold and the principal body, and there is likewise no freedom of movement between the manifold and the supports since the connection between the principal body and the supports is at most an elastic suspension. It is a device for modifying the zero of the oscillatory movement of the manifold with respect to the suspension.

French Pat. No. 2,431,255 describes an adjustable device, no longer horizontally, but in the direction perpendicular to the surface of the ground, of the position of a manifold, this regulation taking place as a function of the spray pressure. In this patent the manifold is not mounted with freedom of movement since the height is positively regulated by a double acting jack.

The process according to the invention has for its object to stabilize with respect to a desired path, a movable member mounted on support points with at least one degree of freedom of movement, the support points following a path making it possible for the movable member to follow the desired path, as a function of the spacing from this desired reference path with respect to a physical reference, while eliminating the influence of irregularities of the followed path by the support point or points, which influence cannot be avoided in the case of elastic suspensions much less rigid connections.

In the process according to the invention to stabilize along a desired path a member which is movable with respect to its support point or points which follow a path making it possible for the movable member to follow the desired path, this mobility including at least one degree of freedom of movement with respect to said desired path between the movable member and the support point or points, there is exerted, between the movable member and the support point or points and as a function of the evolution of the position of the movable member with respect to the desired path, one or more forces whose magnitude is independent of the position of the movable member with respect to the support points.

According to another characteristic of the invention, the desired path is defined with respect to a physical reference and determines the evolution of the actual path relative to the desired path by integrating a plurality of measurements spaced apart in time of the actual position of the movable member with respect to the desired path.

According to a secondary characteristic, the force or forces employed are temporary forces of substantially constant intensity whose duration of application is a function of the action to be exerted on the movable member to return it to the desired path.

The measurements of the series may be spaced apart in time and effected with a predetermined periodicity between the same fixed point on the movable member and the physical reference with respect to which the movable member moves. The measurements spaced apart in time and perhaps also in space, may be utilized according to different known methods of computation of averages with the suppression of aberrant values and systematic weighting of the values introduced into the computation.

The present invention also has for its object an apparatus comprising a member movably mounted for at least one component of movement, on a support which itself is movable and displaceable along a path making it possible for the movable member to follow the desired path, this apparatus comprising in combination and for each component of movement, at least one measuring means for the instantaneous position, according to the direction of said component of movement, of the movable member with respect to a reference element independent of the device, a programmed computer which receives the measured values, compares them to theoretical values corresponding to the desired path for the movable element, and emits a signal as a function of the result of this comparison, and means mounted between the movable member and the support and adapted to exert on the movable member a force changing its position according to the direction of movement of said component of movement, means responsive to the output of the computer, for actuating as a function of that output, these force-exerting means, this device being characterized in that the movably mounted member has a freedom of movement according to the component of movement, the responsive means ensuring the deactuation of the means exerting force between the movable member and the support member apart from its active periods.

According to a practical application to a spray manifold, said manifold is mounted for free rotation about a longitudinal axis carried by the support chassis for the manifold, at least one detector adapted to measure the distance it is spaced from the surface to be sprayed being mounted on said manifold and being spaced from the longitudinal plane of the manifold passing through its axis of articulation, the measurements of the detector or detectors being sent to a programmed computer which effects comparison of the measured values to theoretical values corresponding to parallelism of the spray manifold with the surface to be sprayed and emits a control signal as a function of the result of this comparison, means responsive to said control to actuate the means adapted to exert a couple on said manifold to cause it to turn about said axis, the axis of rotation passing substantially through the center of gravity of the manifold and the means exerting a couple leaving the manifold free to swing freely about this axis apart from its active periods.

The detectors are preferably ultrasonic detectors and there are preferably provided at least four detectors spaced symmetrically along the manifold on either side of the plane passing through the axis of rotation.

The means adapted to exert a couple on the manifold is, according to a first embodiment, constituted by a double-acting jack articulated on the manifold and on the carrying chassis and provided with a source of fluid under pressure, the means responsive to the control being a three-position valve providing, in two of its positions, communication with the source of fluid under pressure with one or the other of the chambers of the jack and, in the third position, intercommunication between the two chambers of the jack.

According to a second embodiment, the means adapted to exert a couple on the manifold is constituted by an electric motor separately driven and mounted on the carrying chassis and whose output shaft drives the manifold about its axis, the means responsive to the control being a device for regulating the motor feed, for example a three-position switch cutting the motor feed or ensuring the motor feed in one or the other direction.

The application of the method for invention of the stabilization of an agricultural spray manifold will be described in greater detail hereinafter in the form of two embodiments with reference to the accompanying drawing, in which:

FIG. 1 is a schematic diagram of stabilization apparatus using a double-acting jack controlled by a three-position valve; and FIG. 2 is a similar schematic diagram showing a separately driven electric motor with a three-position reversing switch.

In the two figures, the manifold has a beam with two arms 1 carrying in known manner spray nozzles (not shown) and mounted for free rotation about an axis 2 passing through its center of gravity. This axis 2 is a longitudinal axis carried by the carrying chassis 3 which rolls on the ground 4 by wheels 5. Under the influence of unevenness of the ground, variations of tranverse slope and external forces such as, for example, the wind, such a manifold which can be very long and which is generally suspended for free rotation about an axis passing above its center of gravity to create a force to return it to position, tends not to remain parallel to the ground, that is to say to the crops to be sprayed and can oscillate which tends to cause its ends to strike the ground and which, in any case, disrupts the regularity of spraying. The invention permits, in the particular application to such a spray manifold, to maintain the manifold parallel to the ground or to the cultivated surface to be sprayed which constitutes the physical reference with respect to which is stabilized the path of the manifold which constitutes a movable member with a degree of freedom (free rotation about axis 2).

According to the invention, there are mounted on the manifold detectors 6 adapted to measure the distance separating them from the physical reference, which is to say from the surface to be sprayed and for example ultrasonic emitter-receiver groups. The measurement results are transmitted by cable 7 to a computer 8. This computer is programmed to perform a weighted mean of these measurements. According to the precision of stabilization which it is desired to obtain, one chooses a weighting rule from among the known ones. In practice, this weighting rule or law eliminates at least the aberrant measurements from the values measured simultaneously by the detectors distributed in the region, namely, along the manifold, these values resulting from the presence of discontinuities in the surface swept by a detector or by malfunction of the latter. In practice there is selected a weighting rule combining a plurality of measurements spaced apart in time to eliminate aberrant values, small variations in position and duration and more generally measurements which do not correspond to a condition necessitating correction of the path. The weighting law also permits taking account of mathematical derivatives of the mean value measured to determine the size of the variation between the actual position of the manifold and the desired position, the direction, and the rate of change of this variation.

As a function of the result of these computations and of the values stored in the memory, characteristic of the suspended movable member, notably its inertia, the programmed computer determines the characteristics of the force to be applied to the movable member and particularly the direction and duration of application when the force is of predetermined magnitude. The result, in the form of a control signal, is transmitted by cable 9.

In the embodiment of FIG. 1, the force to return the manifold 1 to the desired position is exerted by a double-acting jack 10, for example a hydraulic jack. This hydraulic jack is articulated between a point on the manifold 1 and a point on the carrying chassis 3 which are spaced laterally from the longitudinal plane of the carrying chassis that includes the axis 2 so that the jack 10 may exert a couple tending to swing the manifold 1 about the axis 2. This jack 10 is fed by an accumulator 11 placed and maintained under pressure in any known manner, for example by a pump 12 which receives oil from tank 13. The feed of jack 10 is controlled by a three-position valve 14 whose control means 15 is controlled by signals transmitted by cable 9. The neutral position of the valve ensures, according to a characteristic of the invention, the intercommunication between the two chambers of jack 10. In this position, (the volume of the piston rod being compensated in known manner) the jack exerts no force and the freedom of movement of the manifold 1 about the axis 2 is substantially unaffected. On the other hand, control signals, emitted temporarily as a function of the computation, by the computer 8 move, by the control device 15, the valve 14 into one of the other of the positions in which it transmits the pressure of the accumulator 11 to one or the other of the chambers of jack 10 thus exerting on manifold 1, for the duration of the signal, a couple tending to return the manifold to the desired position.

In the embodiment of FIG. 2, the force to return the manifold 1 into the desired position is exerted by an electric motor 16 with separate excitation mounted on the carrying chassis 3 and which drives by a belt 17 a pulley 18 fixed to the axis 2. According to the known characteristics of the separately excited electric motor, it exerts no couple when the excitation is zero and the couple exerted is in one or the other direction according to the direction of the excitation current in the inductor. The inductor of motor 16 is fed by means of a three-position switch 20 whose operating means 21 is controlled by signals emitted by computer 8.

The above embodiments which are described by way of mere examples do not limit the invention, the position detection means, the means to exert temporarily the return force and the means to control the latter being chosen in any manner from known means, according to the intended use.

What is claimed is:

1. A process for the stabilization with respect to a desired path of a movably mounted member according to at least one component of a movement along the actual path, on at least one support point, along a path enabling the movable member to follow the desired path, in which there is exerted, between the movable member and said at least one support point and as a function of the position of the movable member with respect to the desired path, at least one force tending to return the movable member to the desired path, characterized in that the movable member has freedom of movement relative to said support point along at least one component of movement of the desired path, the forces whose magnitudes are independent of the position of the movable member with respect to said support point being applied as a function of the development of the position of the movable member with respect to the desired path and independently of the position of the movable member relative to said support point, the center of gravity of the movable member coinciding with said support point.

2. Stabilization process for stabilizing a suspended movable member according to claim 1, in which the desired path is defined with respect to a physical reference which is a solid support, characterized in that the evolution of the actual path is determined with respect to the desired path by integrating a plurality of measurements, spaced apart in time, of the actual position of the movable member with respect to the desired path.

3. A process for stabilizing a suspended movably member according to claim 1, characterized in that the force employed is a temporary force of a substantially constant magnitude whose duration of application is a function of the action to be exerted on the movable member to return it to the desired path.

4. Apparatus for stabilizing with respect to a desired path a movably mounted member according to at least one component of movement along the actual path, comprising a movably mounted member (1) on a mobile support (3) adapted to move along a path such that the movable member follows said desired path, said apparatus comprising in combination and for each component of movement of the real path at least one measurement means (6) for the instantaneous position, according to the direction of said component of movement, of the movable member (1) with respect to a physical reference (4) independent of the device, a programmed computer (8) which receives the measured values and compares them to theoretical values corresponding to the desired path for the movable member and emits a signal (9) which is a function of the result of this comparison, means (10, 16-18) mounted between the movable member (1) and the support (3) and adapted to exert on the movable member a force modifying its position according to the direction of movement of said component of movement, means (14-20) responsive to the signal emitted by the computer (8) to actuate, as a function of said signal, this force exerting means, characterized in that the movably mounted member has a degree of freedom of movement relative to said support about the center of gravity of the movable member according to the component or components of movement making up the actual path, the responsive means ensuring the disabling of the force-exerting means between the movable member and the mobile support outside of these periods of actuation independently of the position of the movable member relative to the support.

5. Apparatus according to claim 4 applied to a spray manifold mounted for free rotation about an axis carried by the carrying chassis of the manifold comprising at least one detector (6) adapted to measure the distance between itself and the surface to be sprayed which is mounted on said manifold (1) spaced from the longitudinal plane of the manifold passing through its axis (2) or articulation, a programmed computer (8), means to send measurements from said detectors to said computer, said computer effecting comparison between the measured values and theoretical values corresponding to parallelism of the spray manifold with the surface to be sprayed and which emits a control signal (9) as a function of the result of this comparison, means (15-21) responsive to said control signal to actuate means (10, 16-18) adapted to exert a couple on said manifold (1) to make it turn about said axis (2), characterized in that said axis (2) passes substantially through the center of gravity of the manifold, said exerting means (10, 16-18) leaving the manifold free to swing when said exerting means are not actuated regardless of the position of the manifold relative to said chassis.

6. Apparatus according to claim 5 in which the means to exert a couple on the manifold comprises a double-acting jack (10) articulated to the manifold (1) and to the carrying chassis (3) having a source (11) of fluid under pressure, said responsive means (9) comprising a three-position valve (14) effective, in two of its position, to place in communication the source of fluid under pressure (11) with one or the other of the chambers of the jack (10), characterized in that the third position of the valve interconnects the two chambers of the jack leaving the manifold free to swing relative to the chassis.

7. Apparatus according to claim 5, characterized in that the means to exert a couple on the manifold comprises an electric motor (16) separately excited and mounted on the carrying chassis and whose output shaft drives the manifold about said axis, said responsive means being a regulator (20) of the excitation of the motor, the manifold being free to swing relative to the chassis when said excitation is zero.

* * * * *